United States Patent
Mainville

(10) Patent No.: US 11,358,634 B2
(45) Date of Patent: Jun. 14, 2022

(54) ROLL INDUCED FOUR WHEEL STEERING VEHICLE

(71) Applicant: Michael John Mainville, Saint Augustine, FL (US)

(72) Inventor: Michael John Mainville, Saint Augustine, FL (US)

(73) Assignee: Michael J Mainville, St Augustine, FL (US)

( * ) Notice: Subject to any disclaimer, the term of this patent is extended or adjusted under 35 U.S.C. 154(b) by 0 days.

(21) Appl. No.: 15/930,000

(22) Filed: Jun. 2, 2020

(65) Prior Publication Data
US 2020/0331525 A1    Oct. 22, 2020

Related U.S. Application Data

(63) Continuation-in-part of application No. 15/804,046, filed on Nov. 6, 2017, now abandoned.

(51) Int. Cl.
*B62D 9/00* (2006.01)
*B60G 3/26* (2006.01)
*B62D 9/04* (2006.01)
*B60G 15/06* (2006.01)

(52) U.S. Cl.
CPC ............ *B62D 9/002* (2013.01); *B60G 3/265* (2013.01); *B60G 15/067* (2013.01); *B62D 9/04* (2013.01); *B60G 2202/312* (2013.01)

(58) Field of Classification Search
CPC . B62D 7/142; B62D 9/02; B60G 7/02; B60G 15/067; B60G 2200/10; B60G 2300/124; B60G 2500/42; B60G 2800/012; B62K 5/08

USPC ........................................ 280/124.1, 124.103
See application file for complete search history.

(56) References Cited

U.S. PATENT DOCUMENTS

| | | | | |
|---|---|---|---|---|
| 3,596,730 A * | 8/1971 | Cecce | ................. | B62D 7/1536 180/236 |
| 4,146,103 A * | 3/1979 | Walter | ................... | B60K 17/34 180/234 |
| 7,607,695 B2 * | 10/2009 | Moulene | .............. | B62D 31/003 280/775 |
| 8,641,064 B2 * | 2/2014 | Krajekian | ................ | B60G 3/20 280/5.509 |
| 2006/0064223 A1 * | 3/2006 | Voss | ........................ | B62K 25/04 701/52 |
| 2008/0012262 A1 * | 1/2008 | Carabelli | ................. | B62D 9/02 280/124.106 |
| 2009/0108555 A1 * | 4/2009 | Wilcox | ................ | B60G 21/007 280/124.134 |

(Continued)

*Primary Examiner* — William V Gilbert

(57) ABSTRACT

The four wheel steering vehicle utilizes a cage system that extends along the longitudinal axis to protect the driver coupled to a center rail chassis. Front and Back independent suspension links extend outward along the lateral axis pivotally connected to the wheel assemblies enabling four wheel independent suspension. A centrally located pivoting shock provides both steering control and suspension attachment for the shock and spring. The vehicle is controlled by the driver using a steering wheel, acceleration pedal, and a brake pedal. The invention provides a feeling of integration with the vehicle as the driver rolls into turns with the vehicle, while minimizing fatigue caused by the continuous resistance to centrifugal cornering forces.

9 Claims, 5 Drawing Sheets

(56) References Cited

U.S. PATENT DOCUMENTS

| | | | | |
|---|---|---|---|---|
| 2011/0006498 A1* | 1/2011 | Mercier | ............... | B60G 21/00 |
| | | | | 280/124.103 |
| 2014/0027192 A1* | 1/2014 | King | ............... | A63C 17/0006 |
| | | | | 180/181 |
| 2015/0210338 A1* | 7/2015 | Iizuka | ............... | B62K 5/10 |
| | | | | 280/267 |
| 2016/0129937 A1* | 5/2016 | Suzuki | ............... | B60L 50/64 |
| | | | | 180/65.51 |
| 2016/0318562 A1* | 11/2016 | Mainville | ............... | A63H 3/52 |

* cited by examiner

ROLL INDUCED FOUR WHEEL STEERING VEHICLE

FIELD OF THE INVENTION

The invention relates to a vehicle with four wheel steering, four wheel independent suspension, and proportional roll during cornering resulting in an improved driver comfort over adverse terrain.

BACKGROUND OF THE INVENTION

Utility task vehicles or UTV's for short are typically used for recreation or transportation. They can be combustion engine or electrically driven. UTV's typically feature 4 large air filled rubber tires. A typical UTV has independent suspension, although some may feature solid axles. Most UTV's rely on front wheel steering similar to what is found in an automobile. They are well documented in the art.

Prior art design UTV's have provided good performance over rough surfaces, or smooth turns, but can be uncomfortable when rough surfaces are encountered while turning or when turning sharply at high speed. Centrifugal forces developed during such a turn cause the vehicle to roll outward opposite the direction of the turn, creating unwanted sway. As a countermeasure, it is common practice in prior art designs to add sway bars to minimize this roll effect on the vehicle. This however has a negative effect allowing bump forces from one side of the vehicle to be transferred to the other side. During rough or high speed turns, the driver of such vehicle naturally has a tendency to tilt the head, and lean the body into the turn within the confines of the seat. Although effective, this can become tiring and uncomfortable after some time resulting in fatigue.

The subject invention and embodiments has improved upon the limitations exhibited in prior art, with a different approach. The result is a device that enables the user to navigate all terrain with a feeling of integration, and comfort within the vehicle.

SUMMARY OF THE INVENTION

The subject invention and embodiments comprises of a method and apparatus for a four wheel roll steering device with four wheel independent suspension. The invention employs a frame system and independent suspension links, pivotally connected to the wheel assemblies. Furthermore, the subject invention and its embodiments are supported by a mechanically pivoting shock mount, providing both steering control and suspension attachment for the shock and spring. By mechanically rolling the entire chassis of the vehicle laterally into the turn, centrifugal forces experienced by the driver are reduced, resulting in a feeling of integration and comfort even in adverse terrain.

BRIEF DESCRIPTION OF THE DRAWINGS

These and other features and advantages of the present invention and other embodiments will become more readily appreciated as the same becomes better understood by reference to the following detailed description when considered in the connection with the accompanying drawings within. These drawings are for the purpose of illustration and not to be in any way limiting.

DETAILED DESCRIPTION OF THE DISCLOSURE

Figure 1:
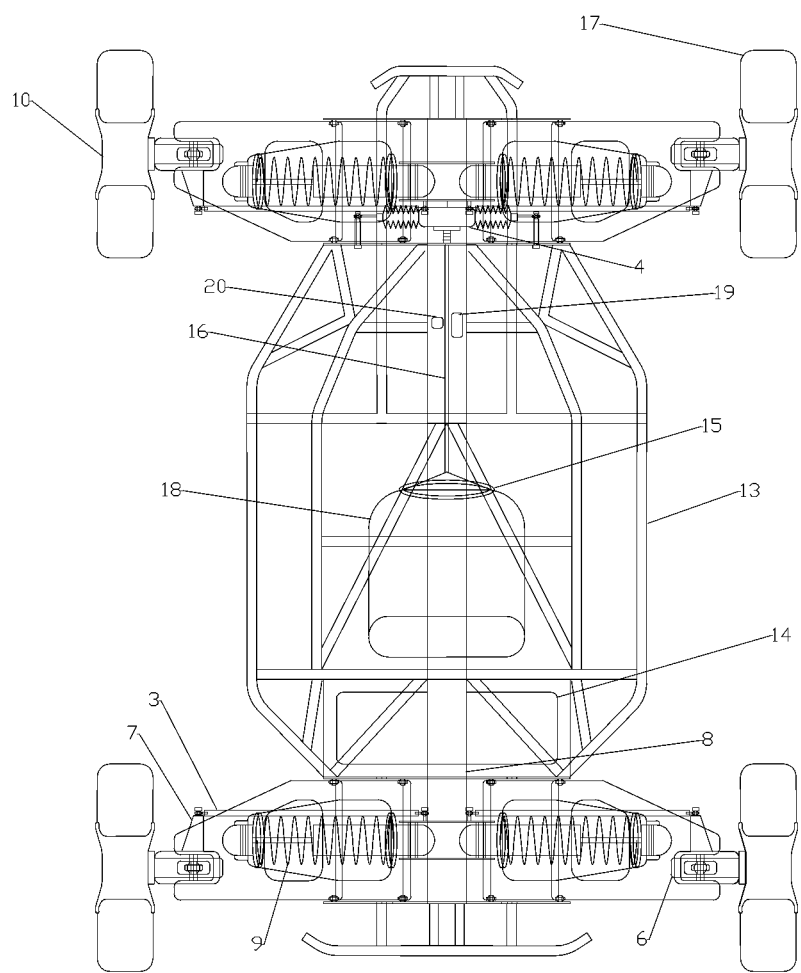
FIG. 1 is a top side view of the vehicle.

FIG. 1 illustrates a top view of one embodiment constructed in accordance with teachings of the present invention. This embodiment can be used for entertainment, sport, or transportation. When operating this device, the driver climbs inside the driver's seat (18), and grabs hold of the steering wheel (15) rotates it, causing the rack and pinion steering unit (4) push laterally on the outside portion of the mounting plate (11). Both roll and steering are accomplished simultaneously by turning steering wheel in the direction of the turn. Speed or braking commands are generated by foot controlled accelerator (19) and brake (20) pedals as is common practice in the art. The illustrated device consists of a center chassis rail (8) providing attachment points for mechanical components and a roll cage (13) for the driver. The tire (17) is rotated by a single sided hub motor (10) with spindle (6) that also serves as the wheel. Each wheel is able to move up and down independently to provide controlled suspension over rough terrain.

Figure 2:
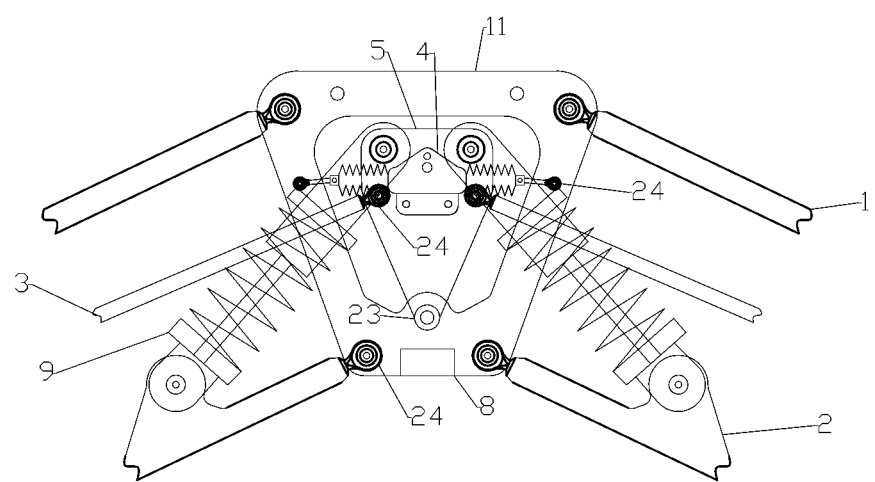
FIG. 2 is a front side partial view of the suspension and steering components, without the wheel assemblies.

FIG. 2 is a partial view of the front of the vehicle illustrating how the upper (1) and lower (2) A-arms are pivotally connected to the mounting plate (11) by use of spherical bearings (24) and hardware. The center chassis rail (8), is welded to the mounting plate (11) creating a strong backbone of the vehicle. The centrally mounted pivoting shock mount (5) rotates on a bearing (23) providing upper attachment for the spring and shock absorber (9). The lower A-arm (2) connects to the lower shock mounting position. The outboard end of the A-arms (1), (2) are pivotally connected to the wheel assembly not shown in this figure. The centrally mounted Pivoting shock mount (5) is located along the longitudinal centerline of the frame. This mechanism is pivotally attached to the mounting plates (11) using cap screws and thrust washers. Connected between the centrally mounted pivoting shock mount (5) and the pitman arm (not shown) is the tie rod (3), with spherical bearings (24) on each end. Mounted beneath the spring and shock absorber (9) on the pivoting shock mount (5) is the rack and pinion steering unit (4). The rack and pinion steering unit (4) is the mechanical devise used to roll the chassis about its longitudinal axis by pushing and pulling on the mounting plate (11). During this action, the pivoting shock mount remains in a vertical position while the chassis of the vehicle roll side to side, resulting in camber changes at the wheel assembles. The relative distance to the spindle (6) centerline changes proportionally, but the distance from the pitman arm (7), to the pivoting shock mount (5) remains constant. This produces the pulling and pushing effect on the pitman arm, resulting in steering action. This steering action is seen at all four wheel assemblies, but occurs in the opposite direction along the centerline of the chassis. The rack and pinion steering unit (4) is mounted at the front of the vehicle, and is not necessary on the rear pivoting shock mount (5).

Steering responsiveness can be altered by changing the ratio of front to back steering action. Typically, it is desirable to have sharper steering in the front of the vehicle than the rear. By adjusting the tie rod mounting position on the spindle, the preferable balance between stability and agility can be found.

Figure 3:
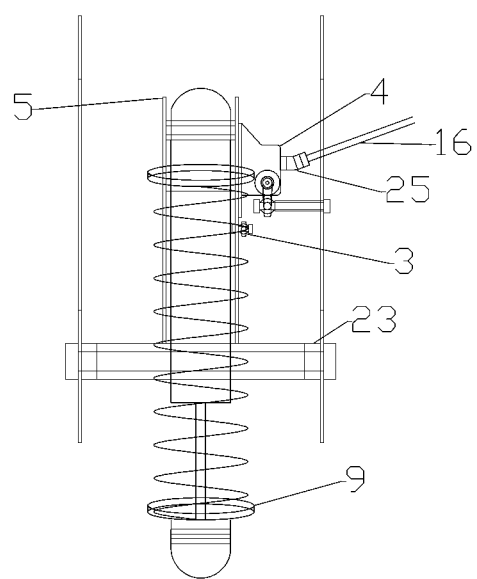
FIG. 3 is a simplified side view of the suspension and steering components without the A-arms and wheel assemblies.

FIG. 3 provides a simplified diagrams showing how the steering shaft (16) passes through a large hole in the mounting plate (11) into a universal joint (25) before connecting to the rack and pinion steering unit (4). The pivoting shock mount (5) is sandwiched between pivoting bearings (23) and the mounting plates (11) to facilitate a pivotal connection. The A-arms are not shown in this diagram to provide a clear view of other features.

Figure 4:
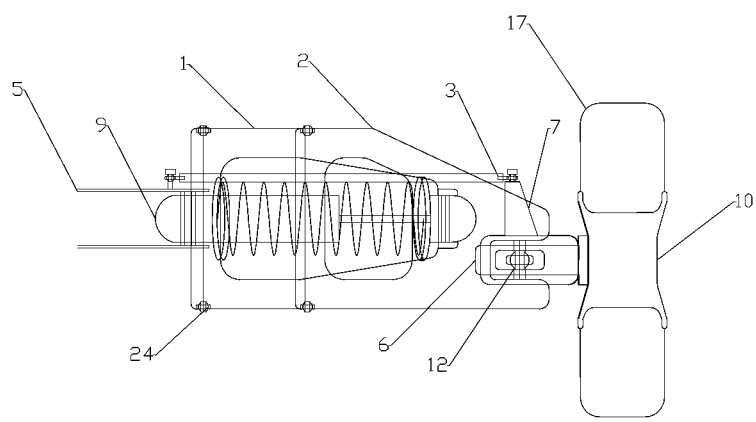
FIG. 4 is a enlarged diagram of a single suspension and steering from the top side, providing a simplified view of the system.

FIG. 4 is an enlarged top side view of the front right hand side A-arm and wheel assemble. The upper A-arm (1) is overlapping the lower A-arm (2). The spring and shock absorber connects between the lower A-arm (2) and the pivoting shock mount (5). The tie rod (3) connects between the pivoting shock mount (5), and the pitman arm (7). The pitman arm is part of the spindle assembly which includes the spindle (6), two uniballs (12), and the hub motor (10). This assembly pivotally connects to the upper A-arm (1) and lower A-arm (2) by use of two uniballs (12), providing vertical and pivotal movement. The inboard side of the upper A-arm (1) and the lower A-arm (2), are pivotally connected using spherical bearings (24).

Figure 5:
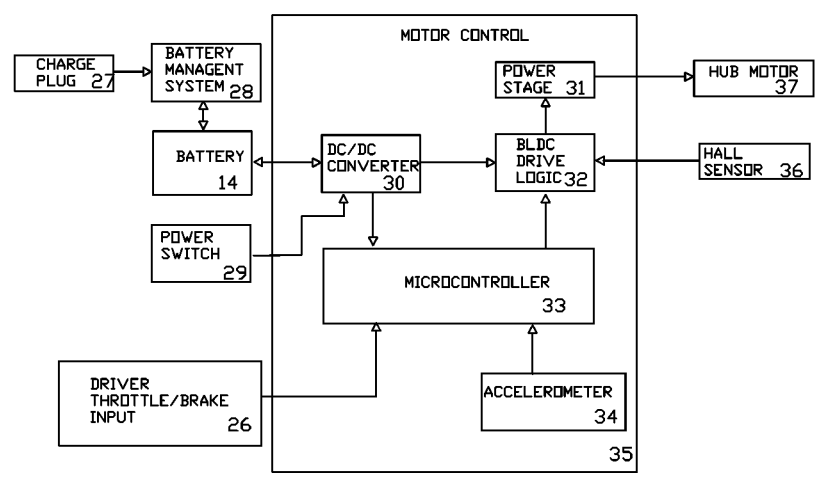
FIG. 5 is a block diagram illustrating how one embodiment would interconnect with the various components to provide a functional system.

FIG. 5 is a block system diagram of the embodiment. The charge plug (27) provides DC voltage to the battery management system (28). The battery management system balances the individual cells of the battery (14), as well as controlling charge current, discharge current, maximum voltage, and cutoff voltage. A power switch (29) mounted on the enclosure enables the system. The microcontroller (33) receives power from the DC/DC converter (30), and input signals from the accelerometer (34) and the acceleration and brake signal. The microcontroller (33) outputs velocity commands to the BLDC drive logic (32). These commands are calculated by a combination of inputs from the driver acceleration and braking inputs, and the accelerometer (34). The driver produces the acceleration or braking actions to be used as analog voltage velocity commands to the BLDC logic. A mathematical algorithm utilizing orientation data from the accelerometer (34) would add or subtract proportional analog voltage velocity commands to the left or right side BLDC motor controllers to aid in turning. Reduced velocity on the inside wheel during a cornering situation than the outside wheel would produce additional turning effectiveness. Additionally, pitch information from the accelerometer (34) would aid in smoothing acceleration and braking, and level the vehicle during high jumping if desired. The power stage (31) supplies the voltage and current to the hub motor (37). Hall sensors (36) mounted inside the hub motor (37) provide velocity feedback and angular motor phasing information for the BLDC drive logic 90.

The invention has been described in an illustrative manner, and it is to be understood that the terminology which has been used is intended to be in the nature of the words of description rather than a limitation. Obviously, many modifications and variations of the preferred embodiment are possible in light of the above teachings. For example one embodiment may include a cantilevered shock assembly. Another example of an embodiment may include suspension links of different lengths. Yet another may have a variation of plates mounted to the frame if any. Yet another may have a simple chain and sprocket, steering box, or linear actuator to manipulate the pivoting shock mount or to the frame for front only steering. One modification may include a combustion engine, while another might simply be a rolling device void of any motors, electrical system whatsoever. It is therefore, to be understood that within the scope of the below claims, the invention may be practiced otherwise than as specifically described. The invention is defined by the claims.

What is claimed is:

1. A utility task vehicle, comprising:
a chassis having:
a mounting plate having an opening extending therethrough;
a chassis rail welded to a bottom portion of said mounting plate;
a pivoting shock mount received in said opening and being connected to said mounting plate by a bearing, said shock mount further connected to said mounting plate by a first spherical bearing and a second spherical bearing, said pivoting shock mount configured to pivot within said opening and with respect to said mounting plate via said bearing;
a first upper A-arm, a second upper A-arm, a first lower A-arm and a second lower A-arm, each said upper A-arm and each said lower A-arm having a first end connected to said mounting plate by a spherical bearing, said first upper A-arm and said first lower A-arm each having second ends connected to a first wheel assembly and said second upper A-arm and said second lower A-arm each having second ends connected to a second wheel assembly;
a first tie rod and a second tie rod, each said tie rod having a first end connected to said pivoting shock mount by a spherical bearing;
a first shock absorber and a second shock absorber, each said shock absorber having a first end connected to said pivoting shock mount and a second end connected to a respective said lower A-arm;
a rack and pinion steering unit mounted on said pivoting shock mount;
whereby said rack and pinion steering unit assists in rolling said chassis about a longitudinal axis through a force being applied to said mounting plate, resulting in said pivoting shock mount's remaining in position while permitting rolling of said chassis which provides a camber change with respect to said wheel assemblies.

2. The utility task vehicle of claim 1, wherein each said wheel assembly includes one or more electrically driven single sided hub motors.

3. The utility task vehicle of claim 2, wherein said hub motors are internally geared.

4. The utility task vehicle of claim 2, wherein an enclosure containing electrical power and control devices is mounted to said chassis, said chassis further comprising a protective cage around said enclosure.

5. The utility task vehicle of claim 1, wherein respective wheels of said wheel assemblies are driven using an internal combustion engine.

6. The utility task vehicle of claim 1, wherein each of the wheel assemblies includes a free-rolling wheel.

7. The utility task vehicle of claim 1, where said rigid chassis is constructed using metal tubing.

8. The utility task vehicle of claim 1, wherein said shock absorbers are coil-over-spring shock-absorbing devices.

9. The device in claim 1, further where a pivoting shack mount is manipulated by a linear actuator, reduction gear box or rack and pinion.

\* \* \* \* \*